United States Patent [19]

Pausch

[11] 4,026,682
[45] May 31, 1977

[54] METHOD OF CHANGING THE LENGTH OF A VENTURI THROAT

[75] Inventor: Josef Pausch, Minnetonka, Minn.

[73] Assignee: General Resource Corporation, Hopkins, Minn.

[22] Filed: Feb. 3, 1975

[21] Appl. No.: 546,539

Related U.S. Application Data

[62] Division of Ser. No. 413,786, Nov. 8, 1973, Pat. No. 3,894,563.

[52] U.S. Cl. .................................. 55/84; 55/223; 261/118; 261/DIG. 56
[51] Int. Cl.² ........................................ B01D 47/10
[58] Field of Search ............. 55/84, 223, 226, 236, 55/237, 240; 261/62, 118, DIG. 54, DIG. 56, DIG. 58; 138/45

[56] References Cited

UNITED STATES PATENTS

| | | | |
|---|---|---|---|
| 1,526,317 | 2/1927 | Chandler | 261/DIG. 58 |
| 2,472,949 | 6/1949 | Jackson | 138/45 |
| 2,486,287 | 10/1949 | Jackson | 138/45 |
| 2,546,673 | 3/1951 | Mattix et al. | 138/45 |
| 3,104,680 | 9/1963 | Orlin | 138/45 |
| 3,236,263 | 2/1966 | Holderer | 138/45 |
| 3,342,462 | 9/1967 | Mick | 261/504 X |
| 3,556,489 | 1/1971 | Ueda | 261/62 |
| 3,601,374 | 8/1971 | Wheeler | 261/62 |
| 3,638,924 | 2/1972 | Calaceto et al. | 261/62 |
| 3,818,681 | 6/1974 | Loquene et al. | 261/62 X |

FOREIGN PATENTS OR APPLICATIONS

| | | | |
|---|---|---|---|
| 2,417,569 | 11/1974 | Germany | 55/226 |
| 252,930 | 2/1970 | U.S.S.R. | 138/45 |

Primary Examiner—John Adee
Attorney, Agent, or Firm—Burd, Braddock & Bartz

[57] ABSTRACT

A Venturi apparatus and method used with a cyclone separator to separate particulates, fumes and waste gases from gas, as air. The apparatus has a housing having a generally rectangular chamber through which the gas and particulates flow. The housing has converging side walls forming an elongated rectangular Venturi throat. Plates movably located in the chamber between the side walls are spaced from each other to control the length of the Venturi throat. Controls connected to the plates are operable to move the plates relative to each other to change the length of the Venturi throat. The width of the Venturi throat is determined by the spacing of the side walls and is not changed by movement of the plates.

16 Claims, 8 Drawing Figures

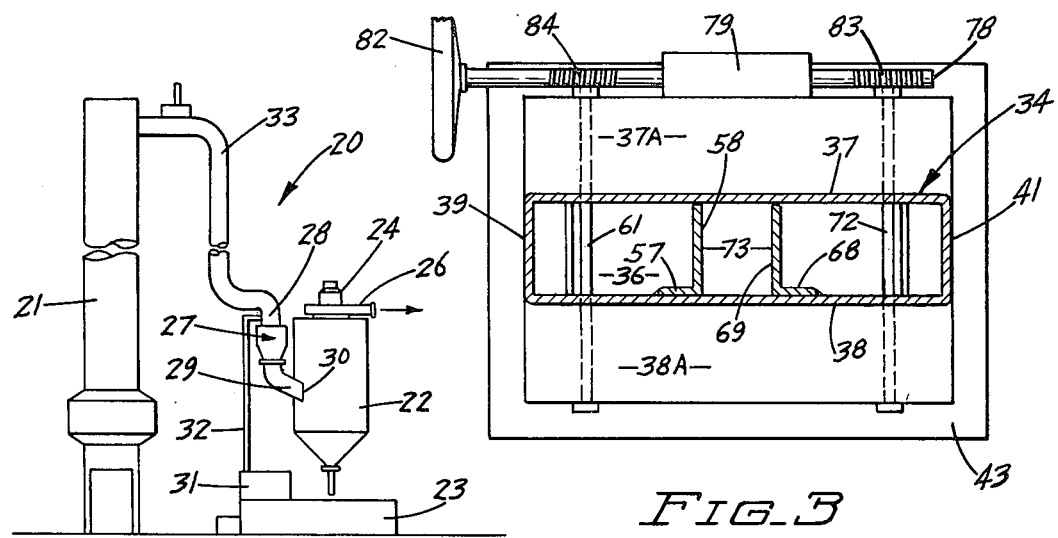
Fig_1
Fig_3
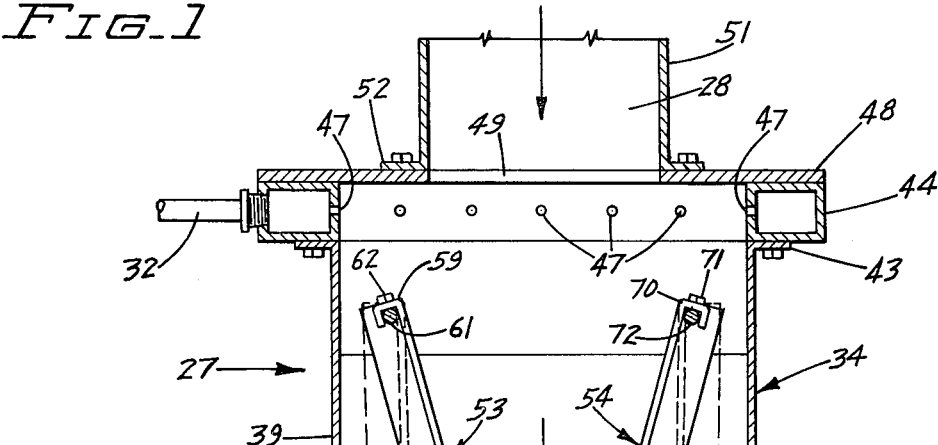
Fig_2

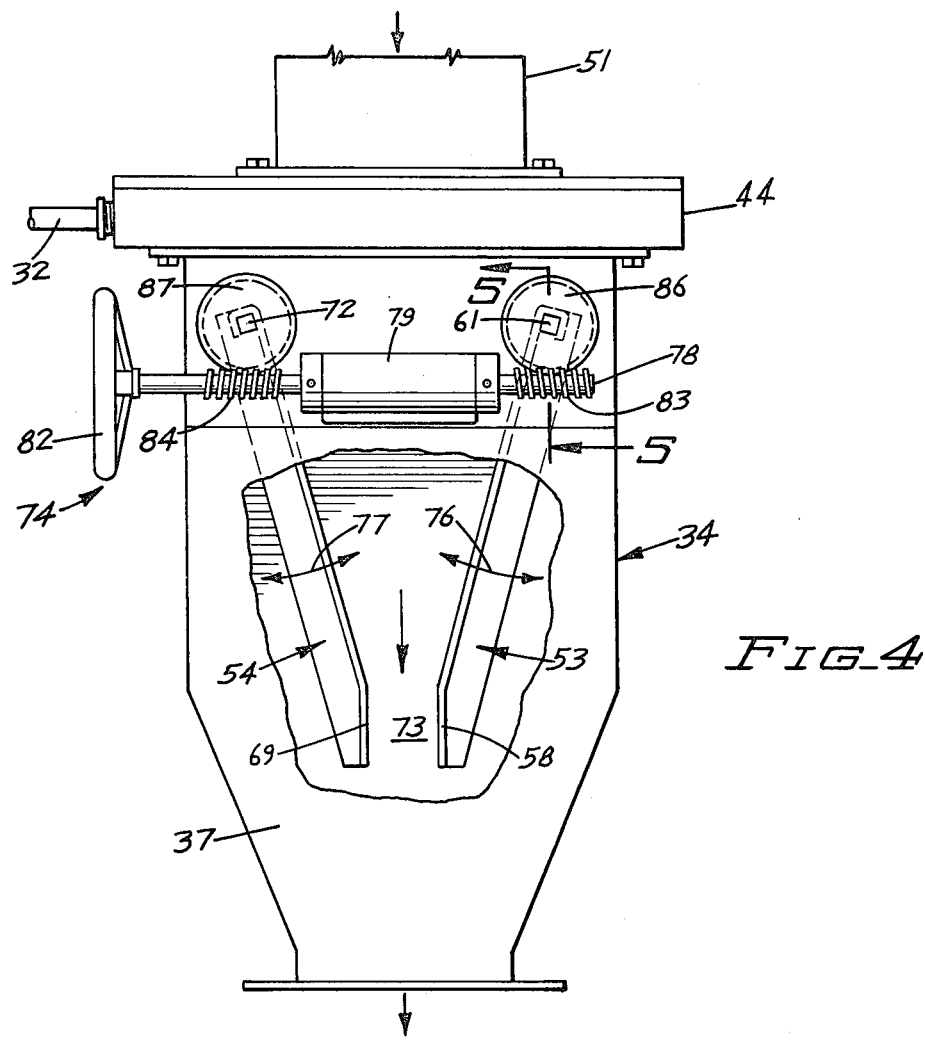
FIG_4
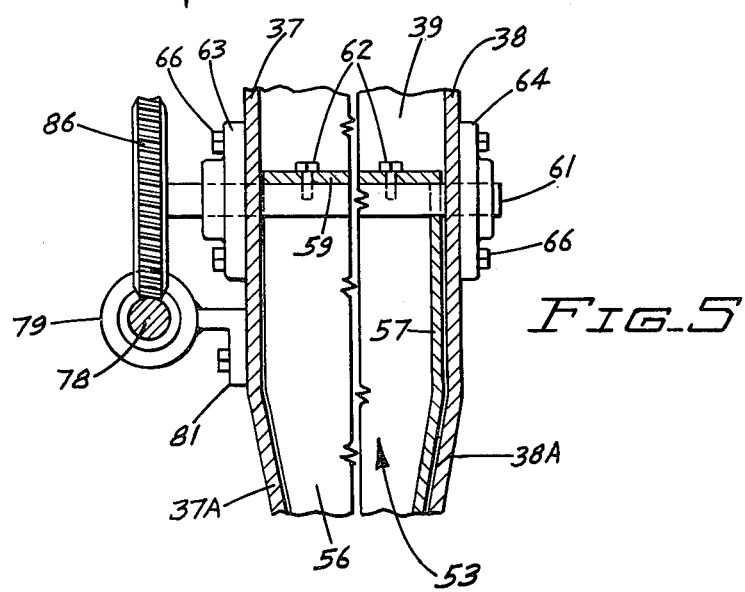
FIG_5

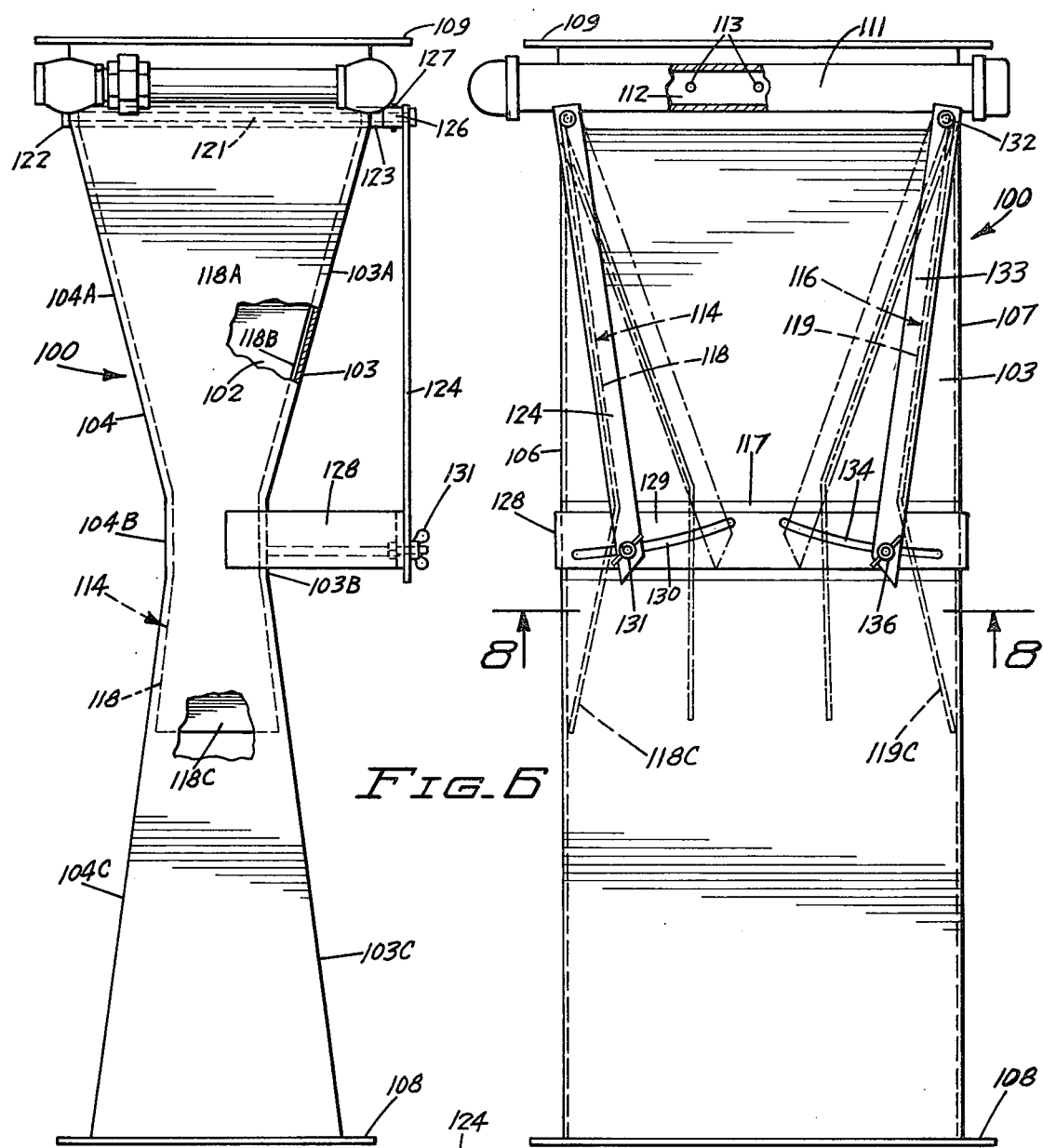

METHOD OF CHANGING THE LENGTH OF A VENTURI THROAT

This application is a division of application Ser. No. 413,786 filed Nov. 8, 1973, now U.S. Pat. No. 3,894,563.

BACKGROUND OF THE INVENTION

The invention is directed to a wet collector apparatus to separate or assist in the separation of particulates from aerosols. Particulates, as dust, mist and fumes, vary in size and are usually insoluble. An overall particle range susceptible to wet collection varies from 0.2 to greater than 10 microns. Dusts are usually at least 1 micron, mists at least 10 microns, and fumes less than 1 micron in size. Wet collectors vary in design and use one or several mechanisms for both conditioning of the particulate and disengaging it from the carrier gas. The effectiveness of the wet collector is dependent upon the degree of interaction it can produce between the dispersed liquid droplets and the particulate.

One type of wet collector is a Venturi scrubber having a Venturi-type constriction through which the carrier gas passes. The Venturi constriction is provided by converging the walls of the inlet to the scrubber. These walls have fixed slopes and form a Venturi throat having a fixed width and length. Venturi structures having variable width throats have been used. These structures have longitudinal dampers movably mounted on the converging walls to vary the width of the Venturi throat. The long longitudinal dampers are moved to change the width of the throat and fluid flow characteristics of the throat. The longitudinal dampers change the angles or slopes of the walls forming the throat, thereby changing the effective slopes of the side walls which alters the efficiency of the structure and causes turbulence in the gas flow. Also, the large longitudinal dampers are difficult to move and hold in adjusted positions.

A scrubbing liquid, usually water, is introduced into the gas flow at or near the constriction of the Venturi. The high gas velocities atomize the scrubbing liquid and the turbulence created leads to increased high collection efficiencies for sub-micron particles as the energy input is increased. The Venturi scrubber functions on the basis of several collection mechanisms. These mechanisms include impingement which results when a particle and droplet collide. In the sub-micron size Brownian movement becomes significant. The Brownian movement and turbulent coagulation are factors which facilitate agglomeration of the particles. Turbulent coagulation results when a velocity gradient is present in an aerosol because particles moving at different velocities in adjacent streams tend to collide.

The energy required to perform the scrubbing action in a Venturi scrubber results in Venturi pressure drop. Scrubbing efficiency is generally a function of this pressure drop. The higher the pressure drop, the higher the removal efficiency of sub-micron particles. The pressure drop required for efficient scrubbing will vary with the particle size of the specific dust, fume or mist to be removed and the overall scrubbing efficiency required. Increasing the inlet gas velocity and/or water jet rate increases the Venturi pressure drop. It is desirable to control the pressure drop to provide for variations in particulates and gas flow.

SUMMARY OF INVENTION

The invention is directed to a Venturi apparatus and method for use with a wet collector operable to separate particulates from aerosols. The Venturi apparatus includes a housing means having a generally rectangular chamber in communication with an inlet and an outlet whereby the gas and particulates can flow through the chamber. The housing means has converging side walls forming an elongated rectangular Venturi throat. Located within the chamber are adjustment means operable to control the length or major dimension of the Venturi throat without changing the width of the throat. The converging side walls have fixed slopes or tapers forming a Venturi throat that has a constant width. This provides optimum fluid flow through the apparatus without loss of efficiency over a wide range of operating conditions. The adjustment means extend across the width or minor dimension of the throat and are movably mounted on the housing means. Control means cooperating with the adjustment means are operable to move the plate means toward and away from each other to vary the length of the Venturi throat. The adjustment means form a variable secondary Venturi throat or a Venturi throat along the length of the primary Venturi throat formed by the converging side walls.

The variable length Venturi throat provides an efficient design for putting Venturi pressure drop to useful work and allows for changes in scrubbing efficiency, as required by changes in pollution codes, and for variations in gas volume. The variable length Venturi throat enables the user to optimize the intimate gas liquid contact with particulates over a wide range of operating conditions and permits the user to adjust the Venturi apparatus to regulate the pressure drop through the Venturi apparatus and thereby adjust the efficiency of the separator. The pressure drop can be changed with the particle size of the specific dust, fume, mist or gases to be removed. This pressure drop, being adjustable by changing the size of the length of the Venturi throat, enables the separator to be used with a wide range of particulates without loss of efficiency.

An object of the invention is to provide a Venturi apparatus and method for use with a wet collector with an adjustable length Venturi throat having a fixed converging configuration usable to regulate the pressure drop through the Venturi apparatus. A further object of the invention is to provide a Venturi apparatus which is usable with the ordinary cyclone separator without modifications or additions to the separator. A still further object of the invention is to provide a Venturi apparatus for controlling the scrubbing efficiency for variations in gas volume. Another object of the invention is to provide a Venturi apparatus that is compact in design, versatile in use and efficient in operation.

In the drawings:

FIG. 1 is a diagrammatic view of an air cleaning installation equipped with the Venturi apparatus of the invention;

FIG. 2 is a longitudinal sectional view of the Venturi apparatus;

FIG. 3 is a sectional view taken along line 3—3 of FIG. 1;

FIG. 4 is a front elevational view, partly broken away, of the Venturi apparatus of FIG. 2;

FIG. 5 is an enlarged foreshortened sectional view taken along line 5—5 of FIG. 4;

FIG. 6 is a front elevational view of a modification of the Venturi apparatus of the invention;

FIG. 7 is a side elevational view of FIG. 6; and

FIG. 8 is a sectional view taken along line 8—8 of FIG. 6.

DESCRIPTION OF THE PREFERRED EMBODIMENT

Referring to the drawing, there is shown in FIG. 1 an air cleaning installation indicated generally at 20 in operative relation with a cupola 21 for cleaning the emissions therefrom. The air cleaning installation 20 has a cyclone separator 22 mounted over a fluid filter 23. Separator 22 has an exhaust fan and motor 24 for driving gas, as air, through the separator and the gas discharge means 26.

The Venturi apparatus of the invention indicated generally at 27 is located adjacent the separator 22. Venturi apparatus 27 has an inlet 28 and an outlet 29. Outlet 29 is a conduit or tube 30 connected to the side of the cyclone separator 22 to deliver the gas and particulates to the inside of the cyclone separator. A pump 31 mounted on the top of the fluid filter 23 delivers a liquid, as water, via pipe 32 to the Venturi apparatus 27. The hot gases and particulates entrained therein are carried from the top of cupola 21 into the inlet 28 of the Venturi apparatus 27 through a pipe or conduit 33.

Air cleaning installation 20 is an example of an application of the Venturi apparatus of the invention. It is understood that the Venturi apparatus 27 is usable with other particulate collectors and in installations including gas scrubbing units for blast furnaces, open hearth furnaces, electric furnaces and rotary kilns. In addition to the metal casting industry, the Venturi apparatus is usable with collectors designed for the chemical industry, mineral products industry, as well as fertilizer and petroleum industries.

Referring to FIGS. 2 and 3, Venturi apparatus 27 has an elongated generally rectangular housing indicated at 34 having a chamber 36. Housing 34 has upright side walls 37 and 38 joined together with upright end walls 39 and 41. Side walls 37 and 38 have fixed sections 37A and 38A, shown in FIGS. 3 and 5, which converge downwardly toward a generally rectangular throat or restriction 73. Housing 34 has an elongated throat 73 with a length-to-width ratio of about 5-to-1. Other length-to-width ratios can be used for the size of the throat 73. Sections 37A and 38A have predetermined and fixed slopes or tapers which provide good fluid flow characteristics. The upper sections of end walls 39 and 41 are flat and are generally parallel to each other. The lower sections 39A and 41A of the end walls 39 and 41 taper or are inclined inwardly in a downward direction and are joined to an outwardly directed flange 42. The flange 42 is used to accommodate fastening means to secure the bottom of the housing 34 to the tube or conduit 29 leading to the cyclone separator 22. End wall sections 39A and 41A can be linear or straight and vertically alinged with walls 39 and 41.

The upper end of housing 34 has an outwardly directed flange 43 carrying a generally rectangular manifold 44. Manifold 44 is a tubular member that surrounds the top of the housing 34. The manifold 44 has a rectangular cross section and an annular chamber 46 for accommodating fluid, as water, delivered via the pipe 32 from the pump 31. Manifold 44 can be a circular pipe. The inner wall of manifold 44 has a plurality of spaced orifices or holes 47 for directing streams of water transversely into the gas and particulates entrained in the gas moving into chamber 46.

Mounted on top of manifold 44 is support plate 48 having an opening 49 axially aligned with the longitudinal axis of chamber 36. A tube or conduit 51 is mounted on top of plate 48 to deliver the hot gases and particulates to the inlet of the Venturi apparatus 27. Tube 51 has an outwardly directed flange 52 for accommodating fastening means, as bolts, to secure the tube to plate 48.

Venturi adjustment or adjusting means indicated generally at 53 and 54 are located in the chamber 36 to provide a variable length Venturi passage or throat 73 through which the gas, water and particulates entrained in the gas flow on the way to the outlet 29 of chamber 46. The Venturi adjusting means 53 and 54 extend across the width or minor dimension of throat 73, having only minimal interference with the Venturi action of the fixed converging side walls 37A and 38A. The Venturi adjusting means are moved relative to each other to change the length or major dimension of throat 73 without effecting the Venturi action of the fixed converging side walls 37A and 38A.

Venturi adjusting means 53, shown in FIGS. 3 and 4, comprises a first movable elongated plate 56 having an outwardly directed elongated rib 57. The lower end of plate 56 has a lip 58 extended at a slight angle away from the longitudinal plane of the plate 56. The sides of the plate 56 are located in continuous relationship with inside side walls 39 and 41 of housing 34. The upper end of plate 56 is a channel-shaped section 59 positioned over a transverse shaft 61 so that the plate 56 moves with the shaft 61. A plurality of bolts 62 secure section 59 to the shaft 61. Shaft 61 has a round cross section and extends between the side walls 37 and 38. Shaft 61 can be replaced with a square shaft. As shown in FIG. 5, shaft 61 is rotatably mounted on bearings 63 and 64. Fasteners 66 secure bearing 63 to the outside of the upper portion of side wall 37 and secure bearing 64 to the outside of the upper portion of side wall 38.

The Venturi adjusting means 54 faces the Venturi adjusting means 53 and has a second movable elongated linear plate 67 terminating in a downwardly extended lip 69. An elongated linear rib 68 extends along one side of the plate and lip. The sides of plate 67 are located in contiguous relationship with the inside side walls 39 and 41 of the housing 34. The upper end of plate 67 has a channel-shaped section 70 positioned over the transverse shaft 72. Fasteners 71, similar to the bolts 62 shown in FIG. 5, secure section 70 to the shaft 72. The shafts 61 and 72 movably support the Venturi adjusting means 53 and 54 within chamber 36 and locate lips 58 and 69 in opposite face-to-face relationship. Lips 58 and 69 have elongated linear generally flat surfaces or faces forming the movable walls of the Venturi throat 73. The space between the lips 58 and 69 forms the length of the restriction passage or Venturi throat 73 which can be varied by moving the Venturi adjusting members or plates 48 and 67 toward or away from each other, as indicated by arrows 76 and 77. The lips 58 and 59 form a variable secondary Venturi throat along the length of the primary Venturi throat formed by converging side walls 37A and 38A. The side wall sections 37A and 38A, being fixed, provide the throat 73 with a constant or fixed width. Plates 56 and 67 are movable relative to each other to change the length of the throat. This change is made in accordance with gas volume, type of particulates in the gas, desired pressure drop and other operational characteristics of the cleaning system. Plates 56 and 67 are easy to move in use as they have relatively narrow faces extended across the short dimension or width of throat 73.

As shown in FIG. 4, the Venturi apparatus 27 has a control indicated generally at 74 for adjusting the relative position of the Venturi adjusting means and thereby adjust the length of the Venturi throat 73. Control 74 has a shaft 78 rotatably mounted on a sleeve bearing 79. The outer end of shaft 78 carries a hand wheel 82 used to rotate the shaft. As shown in FIG. 5, bracket 81 secures the sleeve bearing 79 to the side wall 37. Collars 80 secured to the shaft adjacent opposite ends of the sleeve 79 hold the shaft 78 in assembled relation with sleeve 79. Other types of bearing and holding structure can be used to mount the shaft 78 in operative relation with housing 34. Shaft 78 has a pair of worm threads 83 and 84. Worm thread 83 is in driving engagement with a worm gear 86 mounted on the end of shaft 61. A second worm gear 87 mounted on shaft 72 is in driving engagement with worm threads 84. Worm threads 83 and 84 are in opposite directions as they function to rotate the worm gears 86 and 87 in opposite directions on rotation of shaft 78.

In use, the gases indicated by arrow 88 flow through the conduit or tube 51 into the inlet of chamber 36. The gases and entrained particulates are subjected to the liquid, as water, which emanates from the orifices 47 at the entrance to chamber 36. The liquid coats the particulates and moves with the gas and particulates downwardly between the plates 56 and 67. The velocity of the moving fluids increases as they pass through the Venturi throat 73. This increased velocity of the fluids establishes mechanisms which act on the particulates to agglomerate and merge particulates as they move through the orifice and out the outlet 29. The merged particulates enter the cyclone separator where they are separated from the gas. The effective length of the Venturi throat 73 can be adjusted by turning the hand wheel 82. The worm thread and gear arrangement will rotate the plates 56 and 67, thereby moving the lips 58 and 69 to selected positions, changing the length of the Venturi throat 73 according to the requirements of the partiulates, pressure and gas moving through the Venturi apparatus. This adjustment permits the Venturi apparatus to be used under wide ranges of conditions and numerous types of particulate environment and still maintain a high degree of efficiency.

Referring to FIGS. 6, 7 and 8, there is shown a modified Venturi apparatus indicated generally at 100 for use with a wet collector operable to separate particulates from aerosols. Apparatus 100 has a generally upright housing 101 surrounding a chamber 102. Housing 101 has side walls 103 and 104 joined with end walls 106 and 107. As shown in FIG. 7, the upper portions of the side walls 103A and 104A converge to center sections 103B and 104B. From the center sections the lower portions 103C and 104C diverge outwardly whereby the center section 103B and 104B form a restriction or throat 117 in the chamber 102. The lower edge of housing 101 has an outwardly directed flange 108. A similar outwardly directed flange 109 is at the upper end of housing 101. Flanges 108 and 109 are used to secure the Venturi apparatus 100 to connecting pipes or conduits.

Surrounding the top portion of housing 101 is a manifold 111 for carrying liquid that is introduced into the inlet of the chamber 102. Manifold 111 has a chamber 112 for carrying the liquid. A plurality of holes or orifices 113 direct the liquid transversely into the top or inlet portion of the chamber 102. Manifold 111 is connected to a source (not shown) of liquid under pressure.

A pair of cooperating Venturi adjustment or adjusting means 114 and 116 are movably located in chamber 102. Venturi adjusting means 114 and 116 are located in spaced face-to-face relationship and form therebetween a Venturi throat 117. Venturi adjusting means 114 comprises a plate 118 having a generally triangular shaped body 118A located in the upper portion of the chamber 102. Body 118A has edges 118B located in contiguous relationship with respect to the inside surfaces of the side walls 103 and 104. The lower end of body 118A terminates in a lip 118C which extends through the restricted portion of the passage 102 into the lower section. The side edges of the lip 118C diverge slightly outward and are located in a contiguous relationship with respect to the walls 103C and 104C of the housing.

Venturi adjusting means 116 has a plate 119. Plate 119 has the same general shape as the plate 118 having a body 119A extended upwardly and outwardly to the top section of chamber 102. Extended downwardly from the lower edge of the body is a generally extended lip 119C. Lip 119C extends downwardly into the lower portion of the body. The Venturi throat 117 extends longitudinally the full length of lips 118C and 119C and through the restricted portion of the chamber 102 determined by the side wall sections 103B and 104B.

Referring to FIG. 7, a shaft 121 extends through the upper portions of side walls 103 and 104. The shaft 121 is rotatably mounted on bearings 122 and 123 mounted on side walls 103 and 104 respectively. The upper end of plate 118 is attached to the shaft by welds or suitable securing means so that rotation of the shaft 121 will change the position of the plate 118 in chamber 102. An elongated downwardly extended lever arm 124 is attached to an end of shaft 121 with a sleeve 126. A pin 127 extends through sleeve 126 and shaft 121 whereby angular movement of the lever arm will rotate the shaft 121. The lower end of arm 124 is positioned adjacent a generally U-shaped member 128. U-shaped member 128 is secured to end walls 106 and 107 and forms a brace and guide for lever 124. U-shaped member 128 has a portion 129 that extends parallel to the side wall section 103B. Portion 129 has an arcuate slot 130 having a radius centered on the shaft 121. A nut and bolt assembly 131 extends through slot 130 and a hole in lever 124 aligned with slot 130 to adjustably secure the lever 124 to the member 129 and thereby fix the angular position of the plate 118 in chamber 102.

A second shaft 132 is parallel to and opposite the shaft 121. Shaft 132 is rotatably mounted on the housing with suitable bearings 132A and is attached to a downwardly directed lever arm 133. The member 129 has a second slot 134 having a radius centered on shaft 132. A nut and bolt assembly 136 extends through slot 134 and a suitable hole in the end of lever arm 133 to fix the position of the lever arm 133 to the member 129. The nut and bolt assembly 136 is releasable so that the lever arm 133 can be angularly moved, thereby rotating the shaft 132 to change the position of plate 119 in chamber 102.

In use, the liquid, as water, under pressure is supplied to the manifold 111. This liquid is sprayed into the inlet portion of chamber 102. The gases and entrained particles flow through the fluid spray into the chamber 102. The fixed side walls 103A and 104A form a Venturi passage with the lips 118C and 119C determining the length of the throat 117 of the Venturi. The flowing fluid moves rapidly through throat 117. The length or major dimension of throat 117 is adjustable by moving arms 124 and 133 to the desired angular position in accordance with the flow characteristics and particulate content of the flowing gas. The width or minor dimension of the throat 117 is relatively narrow and constant in dimension. Venturi throat 117 is adjusted in length to a position wherein the Venturi apparatus operates at its optimum efficiency under the flow and particulate conditions applied thereto. The nut and bolt assemblies 131 and 136 are fastened to hold the plates 118 and 119 at their selected relative positions. The arms 124 and 133, being longitudinally aligned with plates 118 and 119 provide a visual indicia of the position of the plates in chamber 102. In other words, the length of the throat 117 can be visually determined by the lateral space between the ends of the arms 124 and 133.

While there have been shown and described preferred embodiments of the invention, it is understood that various changes and modifications may be made by those skilled in the art without departing from the invention. For example, other types of Venturi adjusting plates and control mechanism for positioning the plates in the chamber to control the length of the Venturi throat can be used.

The embodiments of the invention in which an exclusive property or privilege is claimed are defined as follows:

1. A method of adjusting the area of a Venturi throat comprising: providing a Venturi apparatus including adjusting means and a housing having end walls and fixed converging side walls forming a Venturi throat that has a length longer than its width, said side walls forming the length of the Venturi throat, and moving the adjusting means relative to said end walls to change the length of the Venturi throat while the positions of the converging side walls and the width of the Venturi throat remain fixed.

2. The method of claim 1 wherein: the Venturi throat has a generally rectangular cross sectional shape and the adjusting means are moved in the direction of the length of the Venturi throat.

3. The method of claim 1 wherein: the length of the Venturi throat is adjusted by moving a first plate relative to one end wall and a second plate relative to the opposite end wall whereby movement of the plates toward and away from each other changes the length of the Venturi throat.

4. The method of claim 1 including: forming with the adjusting means a secondary Venturi throat along the length of the Venturi throat formed by the converging side walls.

5. The method of claim 1 wherein: an adjusting means includes a plate member located in said passage, and means for movably mounting the plate member on the housing, said changing of the length of the Venturi throat being accomplished by moving the plate member relative to the end wall.

6. The method of claim 5 wherein: an arm member is operably connected to the plate member, said arm member being movable with the plate member, and providing an indication of the location of the plate member with the location of the arm.

7. The method of claim 1 wherein: the adjusting means includes a pair of plate members located in said passage, one plate member located adjacent one end wall, the other plate member being located adjacent to the other end wall, means for movably mounting the plate members on the housing, said changing of the length of the Venturi throat being accomplished by moving the plate members relative to each other and relative to the end walls.

8. The method of claim 7 wherein: a separate arm member is operably connected to each plate member, each arm member movable with its associated plate member, and providing an indication of the locations of the plate members with the locations of the arms.

9. A method of changing the area of a Venturi throat comprising: providing a Venturi apparatus including adjusting means and a housing having end walls and side walls forming a Venturi throat that has a length longer than its width, said side walls forming the length of the Venturi throat, said adjusting means forming the width, and moving the adjusting means relative to the end walls to change said length while said width and the positions of the side walls remain fixed.

10. The method of claim 9 wherein: the adjusting means includes a plate member located in said passage, and means for movably mounting the plate means on the housing, said changing of the length of the venturi throat being accomplished by moving the plate member relative to the end wall.

11. The method of claim 10 wherein: an arm member is operably connected to the plate member, said arm member being movable with the plate member, and providing an indication of the location of the plate member with the location of the arm.

12. The method of claim 11 wherein: the passage is formed by side walls that are fixed members converging toward the venturi throat.

13. The method of claim 9 wherein: the adjusting means includes a pair of plate members located in said passage, one plate member located adjacent one end wall, the other plate member being located adjacent the other end wall, means for movably mounting the plate members on the housing, said changing of the length of the venturi throat being accomplished by moving the plate members relative to each other and relative to the end walls.

14. The method of claim 13 wherein: a separate arm member is operably connected to each plate member, each arm member movable with its associated plate member, and providing an indication of the locations of the plate members with the locations of the arms.

15. The method of claim 13 wherein: the passage is formed by side walls that are fixed members converging toward the venturi throat.

16. The method of claim 9 including: forming with the adjusting means a secondary venturi throat along the length of the venturi throat formed by the side walls.

* * * * *

UNITED STATES PATENT AND TRADEMARK OFFICE
CERTIFICATE OF CORRECTION

PATENT NO. : 4,026,682
DATED : May 31, 1977
INVENTOR(S) : JOSEF PAUSCH

It is certified that error appears in the above-identified patent and that said Letters Patent are hereby corrected as shown below:

Column 3, line 60, "alinged" should be -- aligned --.

Column 4, line 31, "continuous" should be -- contiguous --.

Column 5, line 46, "partiulates" should be -- particulates --.

Signed and Sealed this

Eleventh Day of October 1977

[SEAL]

Attest:

RUTH C. MASON
Attesting Officer

LUTRELLE F. PARKER
Acting Commissioner of Patents and Trademark